United States Patent [19]

White

[11] Patent Number: 5,688,200
[45] Date of Patent: Nov. 18, 1997

[54] LINEAR BICYCLE DERAILLEUR

[76] Inventor: Douglas M. White, P.O. Box 395, Point Reyes, Calif. 94956

[21] Appl. No.: 693,647

[22] Filed: Aug. 9, 1996

[51] Int. Cl.⁶ .................................................. F16H 59/00
[52] U.S. Cl. ................................. 474/80; 474/119
[58] Field of Search ................. 474/78–80, 101, 474/69, 119, 122

[56] References Cited

U.S. PATENT DOCUMENTS

| | | | |
|---|---|---|---|
| 4,193,309 | 3/1980 | Nagano. | |
| 4,259,873 | 4/1981 | Nagano et al. | 474/82 |
| 4,352,503 | 10/1982 | Cotter | 74/346 X |
| 4,551,121 | 11/1985 | Nagano | 474/140 |
| 4,586,913 | 5/1986 | Nagano | 474/80 |
| 4,605,240 | 8/1986 | Clem et al. | 474/80 X |
| 4,900,291 | 2/1990 | Patterson | 474/80 |
| 4,938,733 | 7/1990 | Patterson | 474/80 |
| 5,135,441 | 8/1992 | Gelbien | 474/80 X |
| 5,197,927 | 3/1993 | Patterson et al. | 474/80 |
| 5,407,396 | 4/1995 | Gilbert | 474/80 |
| 5,607,367 | 3/1997 | Patterson | 474/80 |

*Primary Examiner*—Roger J. Schoeppel
*Attorney, Agent, or Firm*—Malcolm B. Wittenberg

[57] ABSTRACT

A derailleur for a bicycle for changing the speed of the bicycle. The derailleur can be distinguished from prior parallelogram designs in employing stationary guide rods over which a pulley wheel assembly is caused to slide as the bicycle's drive chain is shifted between various drive sprocket wheels. Gear shifting is done in a linear motion while being able to center the derailleur's pulley assembly without the use of a return spring which is currently employed by present day parallelogram derailleurs.

7 Claims, 3 Drawing Sheets

5,688,200

LINEAR BICYCLE DERAILLEUR

TECHNICAL FIELD OF INVENTION

The present invention relates to a derailleur attached to a bicycle frame proximate the rear wheel of the bicycle for changing the bicycle gear. The present invention differs from traditional derailleurs in allowing for correct chain positioning relative to the drive sprockets of the bicycle rear wheel as the bicycle's drive chain is caused to move from sprocket to sprocket, by means of linear movement of a pulley wheel assembly that is rotatable at an axis established by the axis of the upper pulley wheel, and without the use of a return spring, which is currently employed by present day parallelogram derailleurs.

BACKGROUND OF THE INVENTION

Virtually all bicycles currently marketed are provided with a series of parallel sprockets fixedly attached to the rear wheel of the bicycle. The drive chain of the bicycle is caused to pass over a from sprocket or cog as the bicycle rider transfers pedal power to the drive chain. The drive chain is then caused to travel over one of a series of rear sprockets driving the rear wheel.

The speed at which a bicycle travels for any given rate of pedal rotation will be determined by which rear wheel sprocket the drive chain has engaged. Shifting between parallel rear wheel drive sprockets is the job of the rear derailleur which is generally controlled by cable connected to a shifter generally supported by the bicycle's handlebars or other suitable bicycle frame component remote from the location of the rear derailleur. Derailleur designs can best be appreciated by referring to FIGS. 8 and 10 of U.S. Pat. No. 5,197,927. As noted therein, the derailleur mechanism is constructed in the form of a parallelogram 70 which has a rear support body pivotally but laterally fixedly connected to hanger 40. There is also provided a pair of parallel links extending forwardly from the support body and a shifter body attached to the forward ends of the links that is shiftable laterally inwardly towards the bicycle frame under the influence of cable tension and shiftable laterally outwardly away from the bicycle frame under the influence of a derailleur return spring contained within the parallelogram.

Although the configuration shown in the '927 patent is quite popular, the use of a spring biased parallelogram introduces a number of mechanical limitations which compromise shifting of the drive chain between parallel disposed drive sprockets carrier by the rear wheel hub of the bicycle. As noted in the '927 patent, there is lost motion in each of the four link pivot pins of the parallelogram whenever shifting is caused to take place. Because the sprocket wheels of the typical derailleur change their angular relationship with respect to the bicycle's drive sprockets as shifting from sprocket to sprocket takes place, there is oftentimes chain rasping as well as a loss in mechanical efficiency depending upon which particular drive sprocket is engaged.

In addition to the above, standard parallelogram derailleurs, as a result of their inherent geometries, require compensation for a variable distance between the upper derailleur pulley wheel and the drive sprocket carrying the bicycle's drive chain. This can result in excessive chain flex which, in extreme conditions, can cause the drive train to completely lift from the bicycle's drive sprocket. Further, as noted above, prior derailleurs are provided with a return spring causing the derailleurs to return to their original position when cable tension is decreased. As such, such derailleurs are constantly in a state of being under an applied force either by the tension of the return spring or the tension of the cable. This can prove troublesome in that it allows the drive chain to reside in a position uncentered upon any particular drive sprocket.

It is thus an object of the present invention to provide a rear bicycle derailleur free of those mechanical limitations inherent as a result of using prior parallelogram designs.

These and further objects will be more readily apparent when considering the following disclosure and appended drawings.

SUMMARY OF THE INVENTION

The present invention involves a derailleur for a bicycle for changing the speed of the bicycle which is equipped with front and rear wheels, the rear wheel being fixedly attached to a series of parallel drive sprockets. The derailleur of the present invention is controlled by a shifting mechanism which is generally located remote from the derailleur and controls the derailleur by control wire attached thereto.

The derailleur of the present invention comprises an upper mount for attaching the derailleur to a bicycle frame proximate the drive sprockets of the bicycle. A pair of stationary parallel guide rods are provided as having first and second ends and which are supported by the upper mount, the guide rods being at an angle inwardly towards the bicycle frame between approximately 15° to 75° to horizontal. A cable housing is mounted fixedly to the second end of the guide rods and a pulley wheel assembly is provided which is slidable over the stationary guide rods in response to a change in shifter orientation.

The pulley wheel assembly of the present invention supports upper and lower pulley wheels over which a drive chain is caused to pass for powering the bicycle. The pulley wheel assembly is rotatable at an axis established by the axis of the upper pulley wheel and is spring biased to take up slack in the drive chain. It is noted that as the pulley wheel assembly is caused to slide over the guide rods in response to a change in shifter orientation, at any particular shift position, a substantially single plane is created by the drive sprocket over which the drive chain passes and the upper and lower pulley wheels and the distance between the upper derailleur pulley wheel and the drive sprocket being driven remains substantially constant.

DETAILED DESCRIPTION OF THE INVENTION

As will be noted from the following discussion, the derailleur of the present invention in not following the standard parallelogram approach differs dramatically from prior art designs. The present derailleur, for the first time, accomplishes correct chain positioning relative to drive sprockets supported by the bicycle's rear wheel as the chain moves from sprocket to sprocket by means of linear movement of a pulley wheel assembly that is rotatable at an axis established by the axis of the upper pulley wheel, and without use of a return spring. Linear movement of the derailleur's pulley wheel assembly, as noted above, is carried out along a pair of stationary guide rods which are permanently fixed in orientation, at all times, with respect to the remaining components of the derailleur and bicycle geometry.

Figure 1:
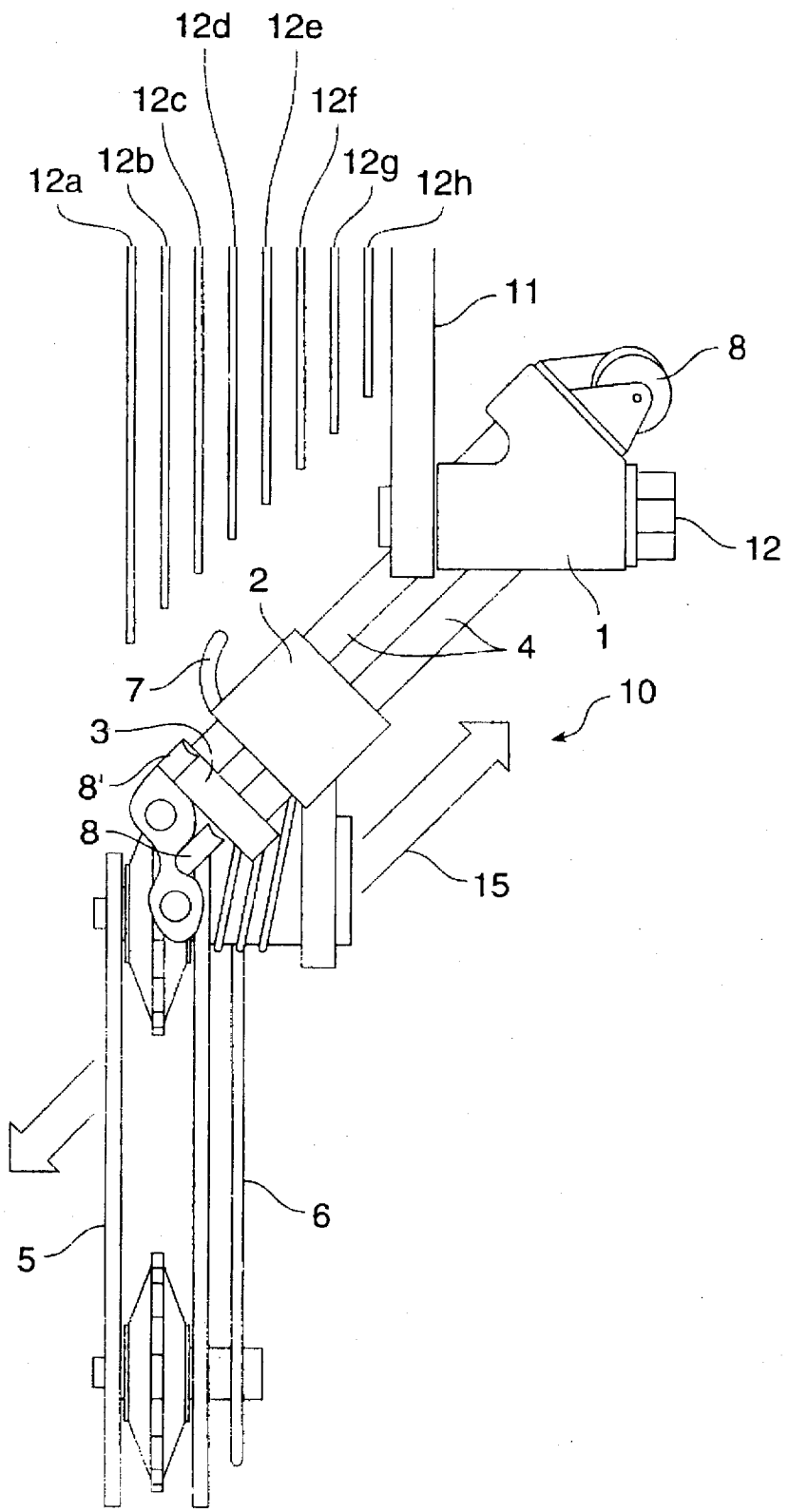
FIG. 1 is a perspective view of the rear bicycle derailleur of the present invention.

Reference is first made to FIG. 1. Derailleur 10 is shown in perspective including an upper mount 1 for connecting the derailleur to bicycle frame section 11 through the use of bolt 12. As noted, the derailleur is positioned on bicycle frame 11 such that pulley wheel assembly 5 is substantially parallel to drive sprockets 12a through h.

A pair of stationary parallel guide rods 4 having first and second ends 4a and 4b (FIG. 2) are provided. Upper mount 1 is fixedly attached to and support guide rods 4 at an angle between approximately 15° to 75° horizontal, the choice of the appropriate angle being discussed hereinafter.

A pulley wheel assembly 5 is shown rotatably supporting upper and lower pulley wheels 13 and 14, respectively, over which drive chain 16 (FIG. 3) is caused to pass. The pulley wheel assembly is rotatable at an axis established by the axis of the upper pulley wheel 13, and is spring biased via spring 6 to assist the derailleur in taking up slack in drive chain 16.

As noted previously, the present derailleur is intended to be controlled by a shifting mechanism (not shown) located remote from said derailleur and being controllably attached to the derailleur by control wire, which is a single or multiple looped cable moving in both directions. In this regard, the derailleur of the present invention is provided with cable housing mount 3, located in a position inward of the point where the derailleur is fixedly attached to the bicycle frame, and being fixedly attached to the second or lower ends 4b of guide rods 4, said cable housing mount representing the lower end point over which said pulley wheel assembly travels as being slidable over said guide rods in response to a change in shifter orientation. A change in shifter orientation actuates movement in either direction of the control wire, a single or multiple looped cable. Use of looped cable with the present linear derailleur provides for low resistance shifting, along with the lack of a return spring which, due to the derailleur being under force only at the time of shifting initation, provides for a self-centering effect on the pulley assembly and drive chain moving over the drive sprockets.

Figure 2:
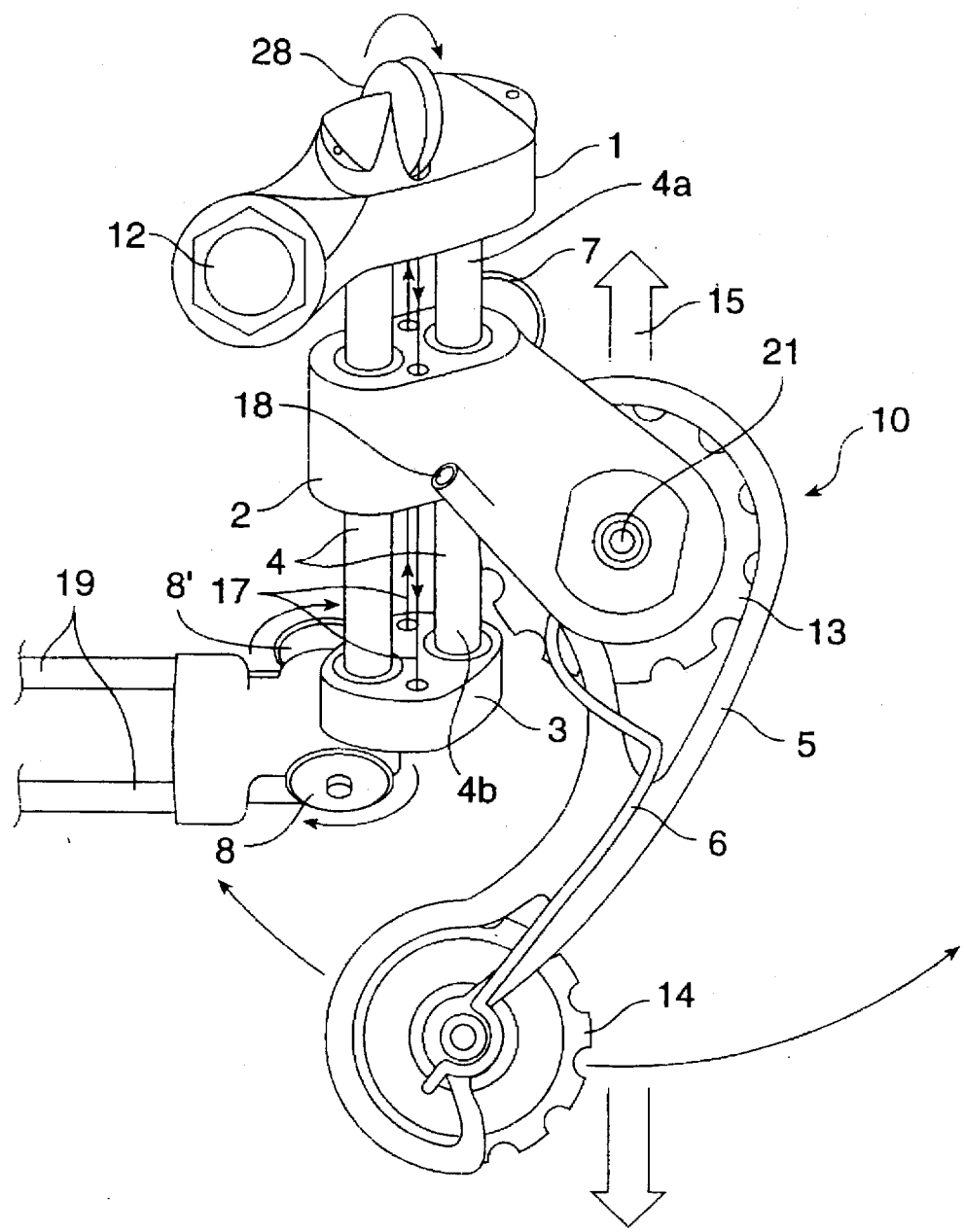
FIG. 2 is a rear plan view of the derailleur of the present invention appended to a bicycle frame.

As depicted in FIG. 2, sheathed cable 19 is shown as being received by housing mount 3. Housing mount 3 provides for both entry and exit of looped cable at cable routing pulley assembly mount 2 to cable routing pulley 28 rotatably mounted onto upper mount 1. Wire 17 is then directed back through linear pulley assembly mount 2 where it is fixed by set screw 18 while being routed down through pulley 8' again rotatably mounted upon cable housing mount 3.

Pulley wheel assembly 2 is moved linearly over stationary guide shafts 4 which is actuated by movement of the looped cable. This cable travels in both directions as shown by the arrows borne by wire 17 (FIG. 2). Pulley wheel assembly mount 2 moves along the length of guide shafts 4 by means of twin sealed linear bearings (not shown) and is activated by movement of the looped cable which is fixed to the pulley wheel assembly by set screw 18. Attached to and part of linear pulley wheel assembly mount 2 is pulley wheel assembly 5 upon which the bicycle chain rides. Top pulley 13 has an axis around which pulley wheel assembly 5 rotates. As noted previously, chain 16 is routed around pulley wheels 13 and 14 and the assembly is held in tension by pulley wheel tension spring 6.

Figure 3:
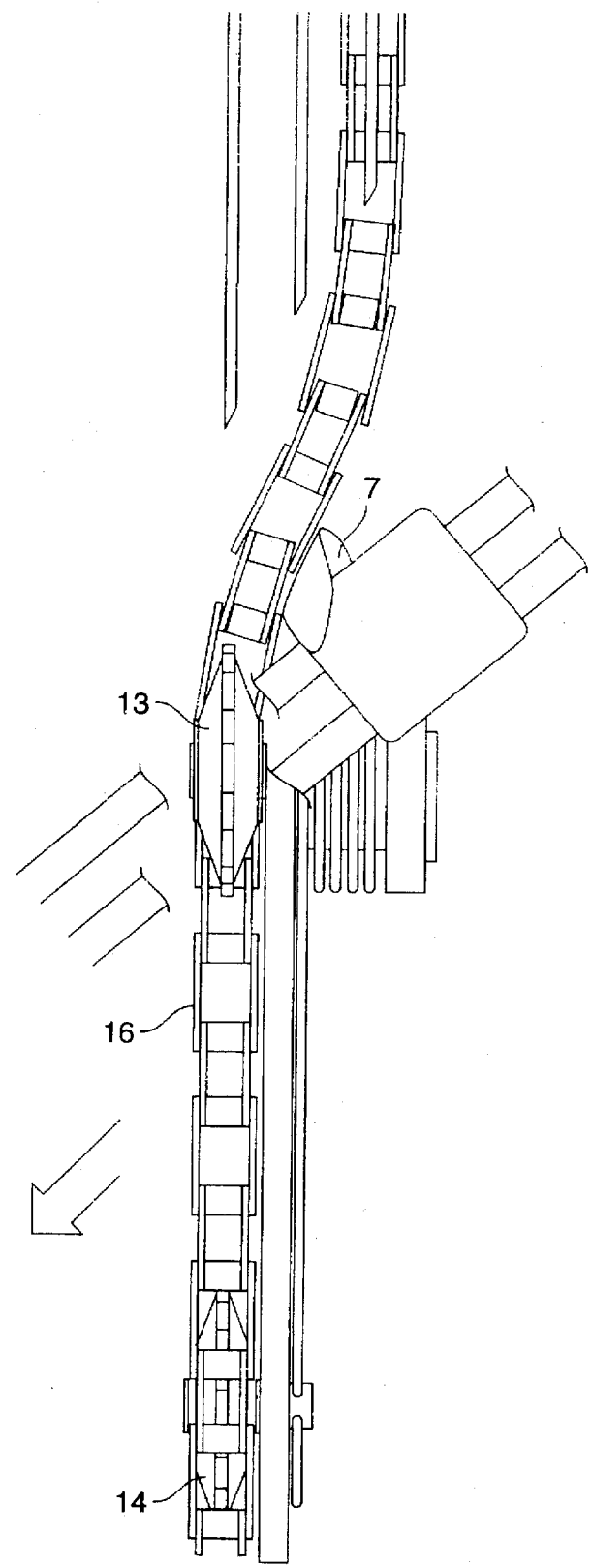
FIG. 3 is yet a second rear plan view of the derailleur of the present invention showing a portion of the bicycle's drive chain engaged by the invention's pulley wheel assembly.

It is quite apparent that movement occurs as a result of movement of pulley wheel assembly mount 2 along guide shafts 4 linearly. This movement actuates chain movement from drive sprocket to drive sprocket at the rear drive wheel of the bicycle. When movement is actuated from a smaller drive sprocket to a larger one, movement is assisted by chain deflector 7 (FIG. 3). In other words, chain deflector 7 pushes against the chain to assist in movement to a drive sprocket of larger diameter. As is quite apparent, chain movement from one drive sprocket to the next is not dependent upon a return spring which is markedly different from the operation of today's standard parallelogram derailleur.

It is further apparent that in practicing the present invention, drive wheel 13 can be made to always have the same distance between it and various drive sprockets 12a–h. In most instances, this is accomplished by providing an angle to horizontal of guide shaft 4 at 45°. However, if the set of drive sprockets has a different sprocket to sprocket dimensional relationship, the angle of guide shaft 4 to horizontal can be configured to an angle other than one of 45°.

It is noted that in actuation of the derailleur of the present invention, single or multiple looped cable(s) is made to travel in both directions for the entire distance from the shifter to derailleur to activate chain movement. Looped cable enters and exits cable housing 3 as shown in FIG. 2 and is routed around various friction reducing devices such as the pulley wheel shown in the figures. Obviously, the cable can be mounted to standard bicycle frames having single cable stops. Universal fit of twin cable systems is achieved through an offset dual cable stop into one cable stop to adapt to a single cable stop mount on standard bicycle flames, a technique which is well known in this art.

I claim:

1. A derailleur for a bicycle for changing the speed of the bicycle, said bicycle being equipped with front and rear wheels, said rear wheel being fixedly attached to a series of parallel drive sprockets, said derailleur being controlled by a shifting mechanism, said shifting mechanism being located remote from said derailleur and being controllably attached to said derailleur by single or multiple looped control wire, said derailleur comprising an upper mount for attaching said derailleur proximate the drive sprockets of said bicycle, a pair of stationary parallel guide rods having first and second ends, said upper mount fixedly supporting said stationary guide rods at an angle between approximately 15° to 75° to horizontal, a cable housing mount fixedly attached to the second end of said guide rods, a pulley wheel assembly rotatably supporting upper and lower pulley wheels over which a drive chain is caused to pass for powering said bicycle, said pulley wheel assembly being rotatable at an axis established by the axis of said upper pulley wheel and being spring biased to take up slack in said drive chain and further being linearly slidable over said stationary guide rods in response to a change in sifter orientation and resulting movement of said looped control wire in either direction such that at any particular shift position a substantially single plane is created by a drive sprocket over which said drive chain passes and said upper and lower pulley wheels.

2. The derailleur of claim 1 wherein the angle to horizontal of said parallel guide rods is such that the distance between said pulley wheel assembly and drive sprocket over which said drive chain passes remains substantially constant as said drive chain is moved between various drive sprockets.

3. The derailleur of claim 2 wherein the stationary parallel guide rods are oriented approximately 45° to horizontal.

4. The derailleur of claim 1 further comprising a deflector plate fixedly attached to said pulley wheel assembly for deflecting said drive chain as the drive chain is caused to move between drive sprockets by the action of said derailleur.

5. The derailleur of claim 1 wherein the pulley wheel assembly is slidable over said stationary guide rods via friction reducing linear beatings or bushings.

6. The derailleur of claim 1 wherein the derailleur is devoid of any biasing return spring and is thus under force only at the time of shifting initiation, providing a self-centering pulley assembly which centers the drive chain over the drive sprockets.

7. The derailleur of claim 1 wherein movement of the derailleur in moving the drive chain is induced by single or multiple looped cable moving in both directions.

* * * * *